May 17, 1932.  G. A. LYON  1,858,515
COMBINATION MIRROR AND TIRE COVER
Filed April 1, 1931
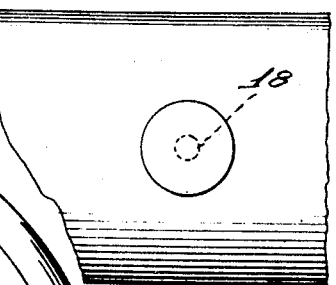
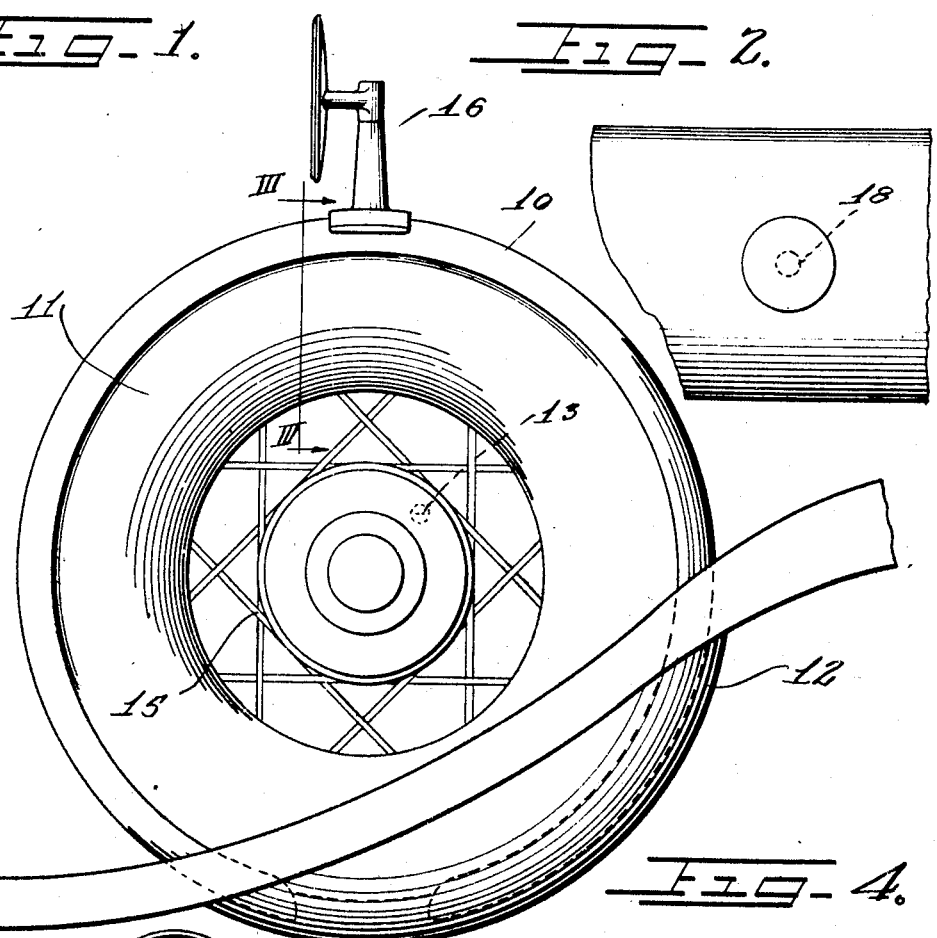
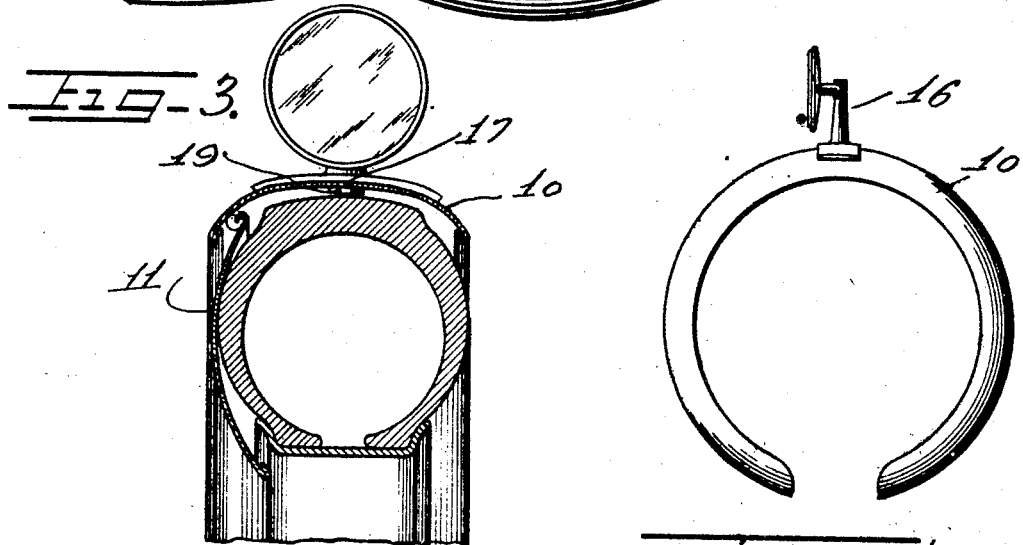
Inventor
George Albert Lyon.
by Charles H. Wills Attys.

Patented May 17, 1932

1,858,515

UNITED STATES PATENT OFFICE

GEORGE ALBERT LYON, OF ALLENHURST, NEW JERSEY, ASSIGNOR TO LYON INCORPORATED, OF ASBURY PARK, NEW JERSEY, A CORPORATION OF DELAWARE

COMBINATION MIRROR AND TIRE COVER

Application filed April 1, 1931. Serial No. 526,883.

The present invention relates to a combination mirror and tire cover construction in which the tire cover for a fender well spare tire is utilized as a mounting for the rear view mirror.

It is to be noted that this invention is a continuation in part of that disclosed in my copending patent application Serial No. 315,455, filed October 27, 1928.

It is the aim of this invention to utilize a tire cover for a spare tire mounted alongside of a motor vehicle body as a mounting for a so-called rear view mirror so that the mounting of the cover on the tire also results in the positioning of the rear view mirror where it is in line with the vision of the operator of the vehicle.

An object of this invention is to provide a combination rear view mirror and tire cover structure in which the tire cover is employed as the mounting for the mirror.

Another object of this invention is to utilize the resilient ring of the so-called Lyon cover as a support and mounting for a rear view mirror so that when once the ring is snapped into proper tire protecting position on the tire, it serves a double function, namely, one as a cover for the tire and the other as a supporting clamp for the mirror.

Still another object of the invention is to so associate a rear view mirror with a tire cover that the locking of the tire cover against unauthorized removal from the tire or wheel on which it is disposed also results in the locking of the mirror against unauthorized removal.

In accordance with the general features of my invention, I have provided a tire cover for a spare tire or wheel disposed in a fender well. The rim portion of the cover has mounted thereon a rear view mirror so positioned with reference to the cover that when the cover is on the spare wheel or tire the mirror will be in line with the vision of the operator of the automobile.

Another feature of the invention relates to the provision of a mounting for a mirror in the form of a split circular rim for covering the periphery of a tire and adapted to be snapped into position on the tire to thereafter contemporaneously cover the periphery of the tire and support the mirror in a position in which the mirror is effective to reveal to the operator of the vehicle the approach of automobiles from his rear side.

Other objects and features of this invention will more fully appear from the following detail description taken in connection with the accompanying drawings in which Figure 1 is a side view of a cover showing it applied to a spare wheel or tire disposed in a fender well mounting, the rim portion of which cover has mounted thereon a rear view mirror.

Figure 2 is a fragmentary plan view of a portion of the rim of the cover showing how the opening in the rim for receiving the stud of the mirror may be normally covered by a plate when the mirror is not desired.

Figure 3 is a fragmentary sectional view taken on substantially the line III—III of Figure 1 looking in the direction of the arrows, showing the centralized position of the mirror with reference to the cover; and Figure 4 is a side view of the rim part of the cover to which is secured the mirror prior to the application of this part to the spare tire or wheel.

The tire cover selected for the illustration of the present invention is of the two-part type and is illustrated as being applied to a fender well installation of a spare wheel and tire. The two parts include a split circular rim 10 and a side plate 11 which may be made of any suitable material, such, for example, as metal, rubber, and the like.

The split metal rim 10, as best shown in Figures 3 and 4, is formed to extend clear across the outer periphery of the tire and has an inherent resiliency tending to cause it to assume a diameter slightly less than that of the tire to which it is applied. This feature is advantageous for the reason that it enables the rim to be snapped into place onto the tire and further enables the resiliency of the rim to retain the ring in position on the tire as well as hold the side plate 11 in place as best shown in Figure 3

The side plate 11 is of ring like shape and has a convex cross section of such a contour as to enable the rim to cover the outer side wall of the tire shown in Figure 3.

These two parts of the cover do not per se constitute the present invention for the reason that a cover embodying such types has been disclosed and is being covered in a copending application of the applicant.

This cover is applied to the tire on the wheel prior to the disposition of the wheel in the fender well which is designated generally by the reference character 12. After the wheel with the cover thereon has been disposed in this fender well the wheel may be locked against unauthorized removal from the fender well 12 by means of the usual locking device 13 disposed in the interior of the hub of the wheel which wheel is designated generally by the reference character 15. Needless to say, the locking of the wheel against removal from the fender well also results in the locking of the cover against removal from the tire.

Now my present invention concerns itself with the utilization of the tire cover as a mounting for a rear view mirror such as at present used in conjunction with the conventional automobile. This rear view mirror is designated generally by the reference character 16 and is illustrated as being applied to the rim 10 of the cover, which rim constitutes the mounting for the mirror.

The mirror is provided with a stud 17 as best shown in Figure 3 which is adapted to pass through an opening 18, Figure 2, formed in the top of the metal rim 10 and firmly anchored to the rim by means of a nut 19 or the like disposed on the under side of the rim 10 and secured to the inner end of the stud 17.

It is to be noted that the opening 18 is disposed on the median line of the rim 10, or in other words is disposed in substantially the same plane as the median line of the tire and wheel. This arrangement of the opening 18 with respect to the cover enables a centralization of the rear view mirror.

Furthermore, after the cover has been applied to the tire by the snapping or shoving of the rim 10 into proper tire protecting position, the position of the mirror may be adjusted by moving the rim circumferentially of the tire. Thereafter, upon the disposition of the wheel and cover in the fender well the entire assembly, including the wheel, tire cover and mirror may be locked against unauthorized removal from the fender well by the lock 13.

In the combination structure above described, it will be further appreciated that the rear view mirror 16 is entirely dependent for its support upon the tire cover, and that by the use of the cover itself the mirror may be adjusted or removed into such a position as to bring it in the line of vision of the operator of the vehicle.

Furthermore, on account of the fact that the mirror is of a lesser width than the cover or the cover rim 10, it follows that if the rim 10 is laid flat on the ground the mirror or its edges will not in any way come in contact with the ground. This is advantageous for the reason that the laying or dropping of the cover into a flat position on the ground will not result in the edges of the mirror being damaged by contact with the ground.

Now it is of course to be understood that while I have illustrated and described in detail the preferred embodiment of my invention, the invention is not to be thus limited but only insofar as defined by the scope and spirit of the appended claims.

I claim as my invention:

1. The combination with a rear view mirror for an automobile, of a spare tire cover having means for securing it in position in an automobile and having the mirror mounted thereon so as to be entirely dependent for its proper support upon said cover, the plane of such cover in position being such as to bring the mirror into the line of vision of the automobile operator so that the mere operation of mounting the cover on the tire will enable the mirror to be properly supported on the tire and such that an angularity of the mirror to said line of vision may be adjusted by the circumferential movement of the cover relative to the tire, said mirror having a connection with the cover only accessible from the underside of the cover to preclude unauthorized removal of the mirror from the cover when the cover is held in place on the tire.

2. The combination with a rear view mirror for an automobile, of a spare tire cover having means for securing it in position in an automobile and having the mirror mounted thereon so as to be entirely dependent for its proper support upon said cover, the plane of such cover in position being such as to bring the mirror into the line of vision of the automobile operator so that the mere operation of mounting the cover on the tire will enable the mirror to be properly supported on the tire and such that an angularity of the mirror to said line of vision may be adjusted by the circumferential movement of the cover relative to the tire, the width of said mirror being less than the width of said cover so that the former will be protected by the latter.

In testimony whereof I have hereunto subscribed my name at Chicago, Cook County, Illinois.

GEORGE ALBERT LYON.